(12) United States Patent
Egnor, Jr.

(10) Patent No.: US 9,500,509 B2
(45) Date of Patent: Nov. 22, 2016

(54) GRANULE MEASUREMENT APPARATUS

(71) Applicant: Daniel Allen Egnor, Jr., Harvest, AL (US)

(72) Inventor: Daniel Allen Egnor, Jr., Harvest, AL (US)

(*) Notice: Subject to any disclaimer, the term of this patent is extended or adjusted under 35 U.S.C. 154(b) by 20 days.

(21) Appl. No.: 14/626,496

(22) Filed: Feb. 19, 2015

(65) Prior Publication Data
US 2015/0233748 A1 Aug. 20, 2015

Related U.S. Application Data

(60) Provisional application No. 61/942,377, filed on Feb. 20, 2014.

(51) Int. Cl.
*G01F 11/24* (2006.01)

(52) U.S. Cl.
CPC ..................... *G01F 11/24* (2013.01)

(58) Field of Classification Search
CPC ........................................... G01F 11/24
USPC ....... 222/427, 425, 430, 450–452, 441, 370, 222/410
See application file for complete search history.

(56) References Cited

U.S. PATENT DOCUMENTS

| | | | | |
|---|---|---|---|---|
| 2,193,235 A * | 3/1940 | Jones | ........................ | C05B 1/10 222/108 |
| 2,211,452 A * | 8/1940 | Bowman | ................. | A47F 1/035 222/429 |
| 2,584,781 A * | 2/1952 | Beatty | ..................... | G01F 11/24 222/181.2 |
| 2,901,150 A * | 8/1959 | Matter | .................... | G01F 11/24 222/370 |
| 5,529,221 A | 6/1996 | Roy | | |
| 8,047,408 B2 | 11/2011 | Eaton et al. | | |
| 2001/0027823 A1 * | 10/2001 | Luchinger | ............ | G01G 13/024 141/83 |
| 2002/0125275 A1 * | 9/2002 | Smith | ..................... | G01F 11/22 222/541.1 |
| 2010/0012684 A1 * | 1/2010 | Eaton | ..................... | G01F 11/24 222/370 |

* cited by examiner

*Primary Examiner* — Donnell Long
(74) *Attorney, Agent, or Firm* — Dunlap Bennett & Ludwig PLLC

(57) ABSTRACT

A granule measurement apparatus is provided. The granule measurement apparatus includes a storage container, a measuring device and a dispenser. The storage container includes a top end and a bottom end. The top end forms a top opening leading into the storage container. The bottom end forms a bottom opening leading out of the storage container. The measuring device includes a top end and a bottom end, and a plurality of measuring chambers. Each of the plurality of measuring chambers includes a top opening leading into the measuring chamber and a bottom opening leading out of the measuring chamber. The dispenser formed to cover and uncover the bottom openings of each of the chambers. At least the bottom end of the storage container and the top end of the measuring device mate and are rotatable relative to one another about a common axis.

9 Claims, 5 Drawing Sheets

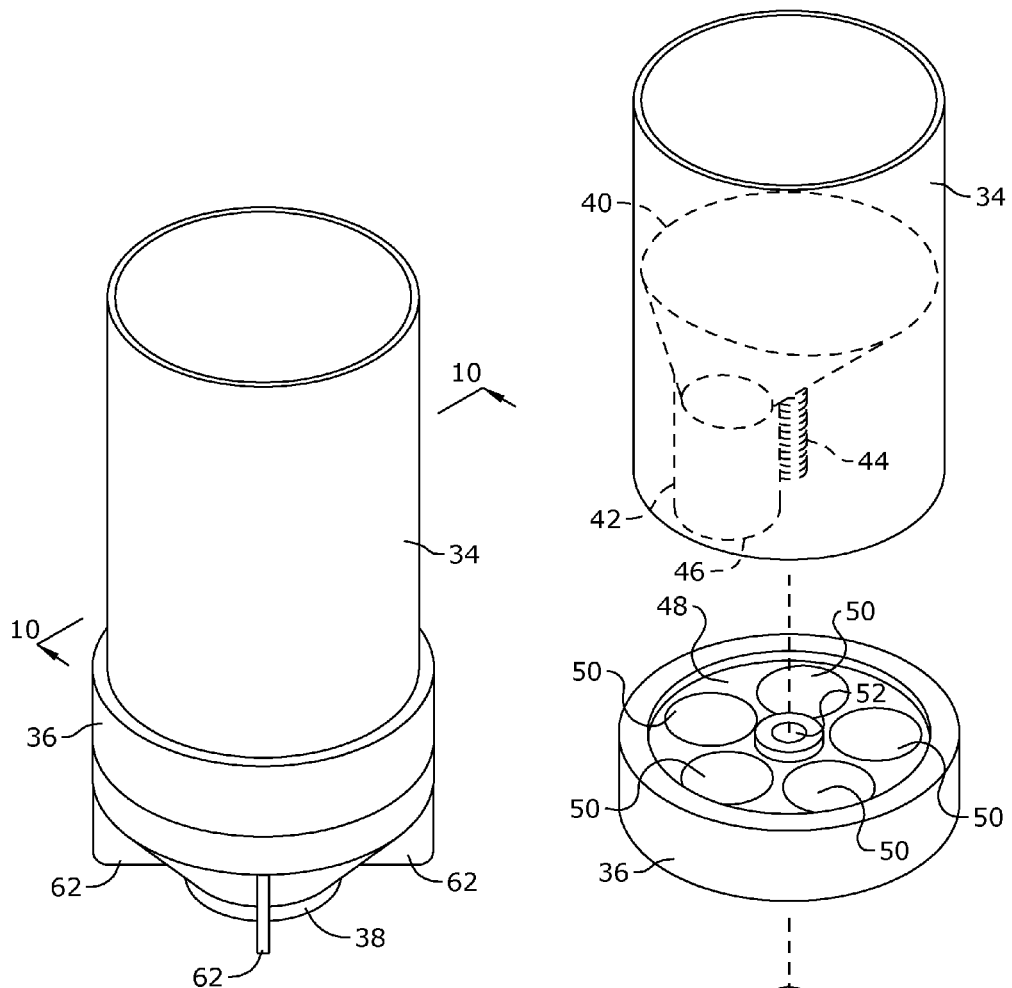
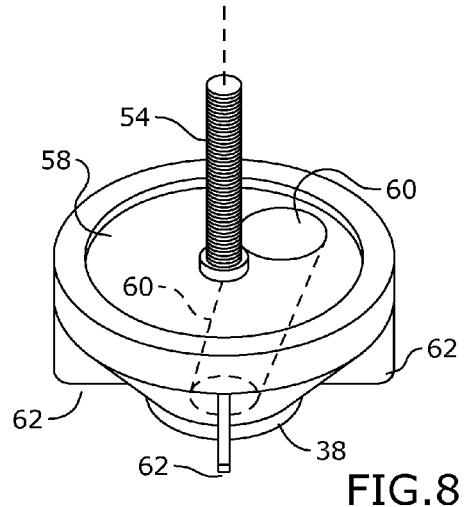

GRANULE MEASUREMENT APPARATUS

CROSS-REFERENCE TO RELATED APPLICATION

This application claims the benefit of priority of U.S. provisional application No. 61/942,377, filed Feb. 20, 2014, the contents of which are herein incorporated by reference.

BACKGROUND OF THE INVENTION

The present invention relates to measuring devices and, more particularly, to a granule measurement apparatus.

Various types of food and ingredients come in the form of granules and are stored in a container for use. To use them, it is required to extract a measured portion from a storage container and dispense this portion. This requires several tasks including locating the appropriate measuring device, using it to extract the portion and transferring it to the target. Each of these tasks take time and often require repeating, resulting in wasted time and unwanted messes.

As can be seen, there is a need for an improved granule measurement apparatus.

SUMMARY OF THE INVENTION

In one aspect of the present invention, a granule measurement apparatus comprises: a storage container having a top end and a bottom end, wherein the top end forms a top opening leading into the storage container, wherein the bottom end forms a bottom opening leading out of the storage container; a measuring device comprising a top end and a bottom end, and comprising at least one measuring chamber comprising a top opening leading into the measuring chamber and a bottom opening leading out of the measuring chamber; and a dispenser formed to cover and uncover the bottom opening of the at least one chamber, wherein the bottom end of the storage container and the top end of the measuring device mate and are rotatable relative to one another about a common axis.

These and other features, aspects and advantages of the present invention will become better understood with reference to the following drawings, description and claims.

BRIEF DESCRIPTION OF THE DRAWINGS

FIG. 7 is a perspective view of an alternate embodiment of the present invention;

FIG. 8 is a top exploded view of an alternate embodiment of the present invention;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a manually operated, hand-held dispenser for measured quantities of granules. The present invention combines the storage container, measuring device and dispenser into one device. The present invention enables a repeated dispensing of an accurate, measured quantity to the target with ease. The present invention can easily be altered to enable varied quantities to be measured and dispensed. The present invention can be configured to store both large and small quantities. The configuration of stored quantity to measured quantity to dispense rate can vary greatly, permitting many and varied applications.

In certain embodiments, the present invention permits quick and easy dispensing of multiple combinations of the measured quantity. For applications that require more precise quantities to be dispensed, smaller measured quantities can be dispensed in succession to deliver the appropriate total amount. This is accomplished without sacrificing convenience. The present invention may be made from a few, simple parts that are inexpensive to manufacture, conducive to high reliability and durability, and easy to maintain and clean. Further, the present invention can be manufactured to be completely dishwasher safe. The present invention is highly scalable making it fit-for-purpose for many applications. The scale of the measured quantity can vary independently from the scale of the storage quantity.

Figure 1:
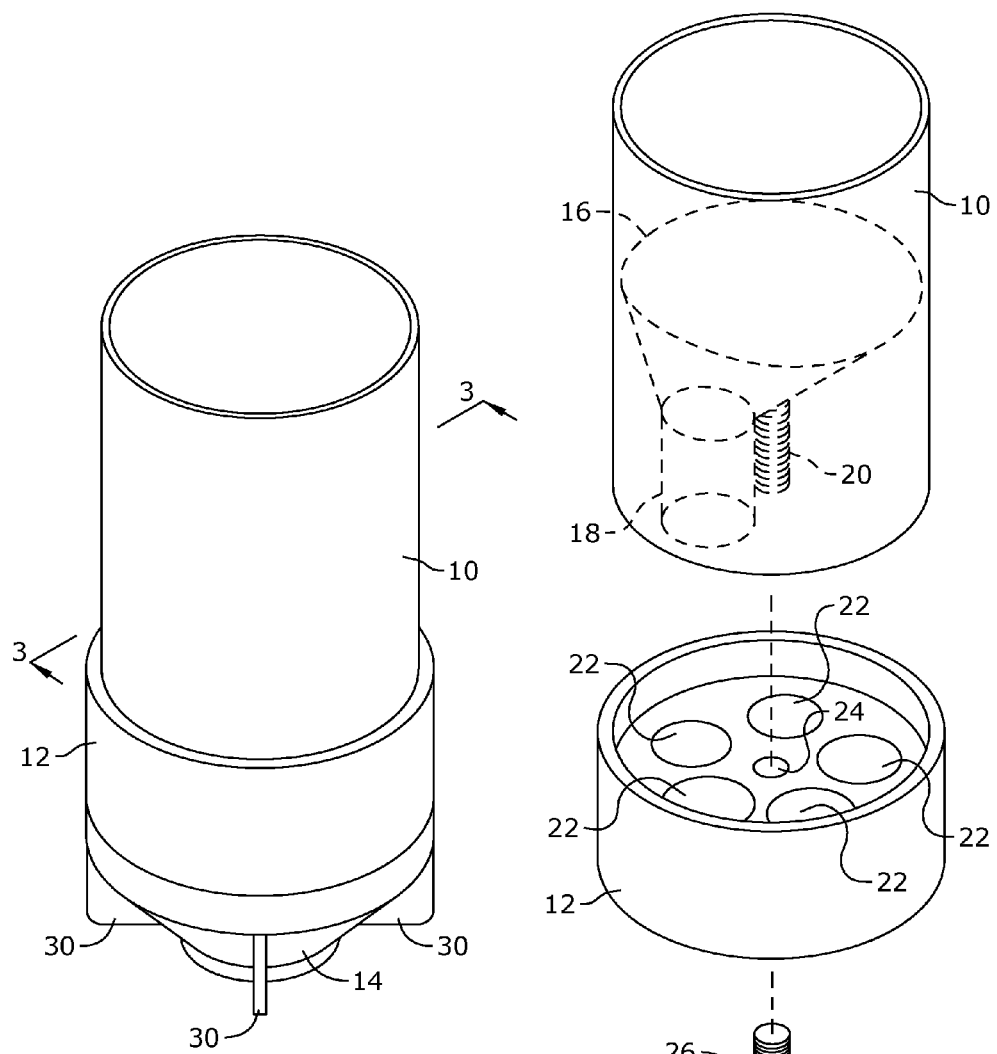
FIG. 1 is a perspective view of an embodiment of the present invention.
Figure 2:
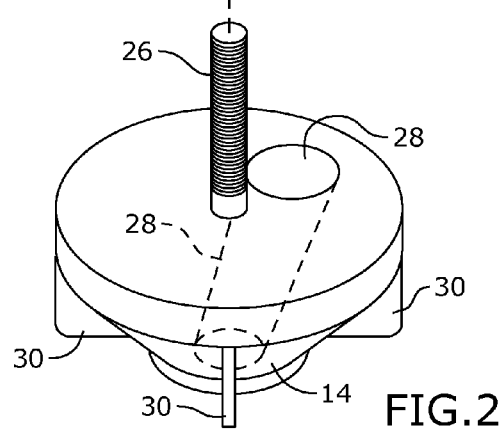
FIG. 2 is an exploded view of an embodiment of the present invention.
Figure 3:
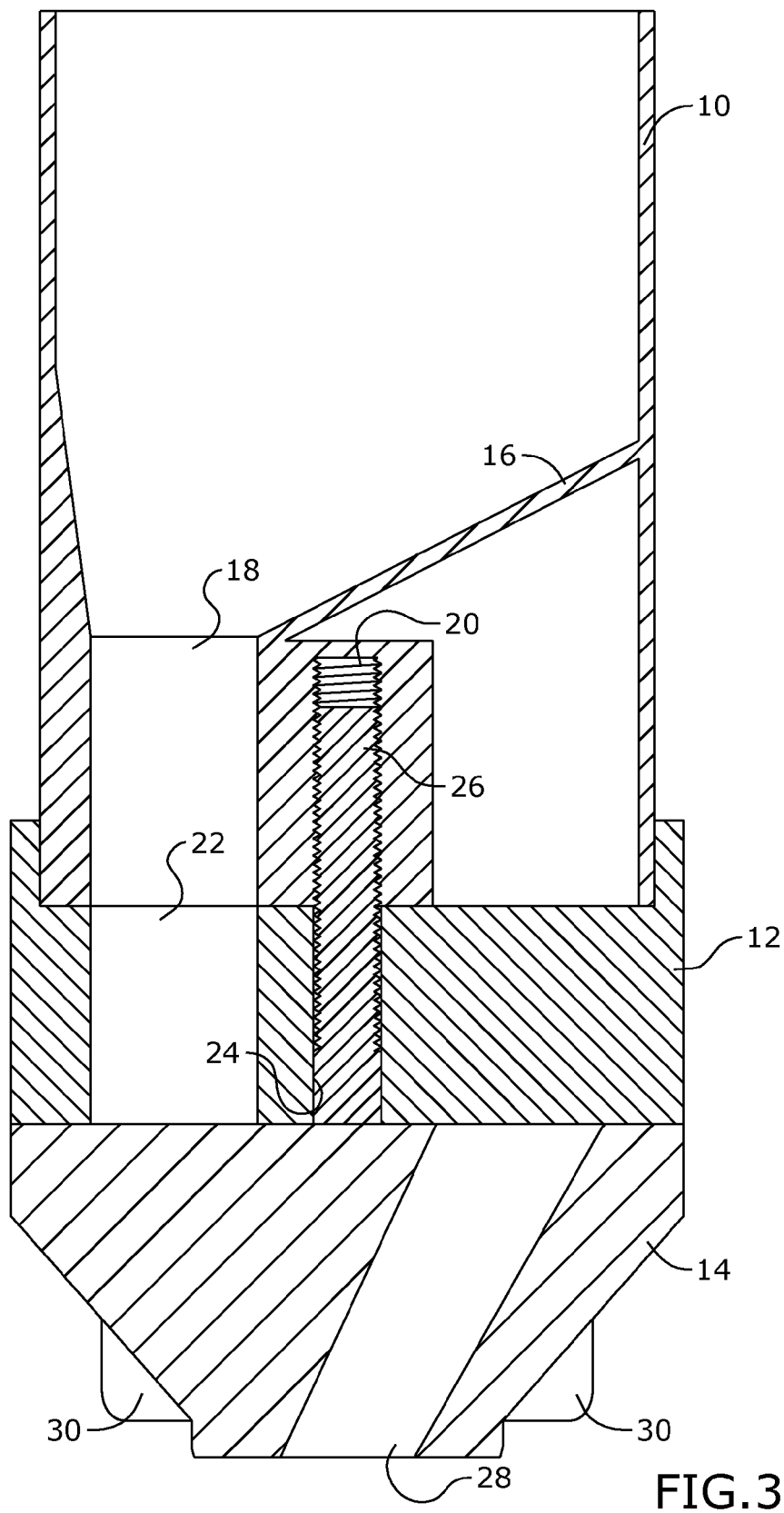
FIG. 3 is a section view of the present invention, taken along line 3-3 in FIG. 1.
Figure 4:
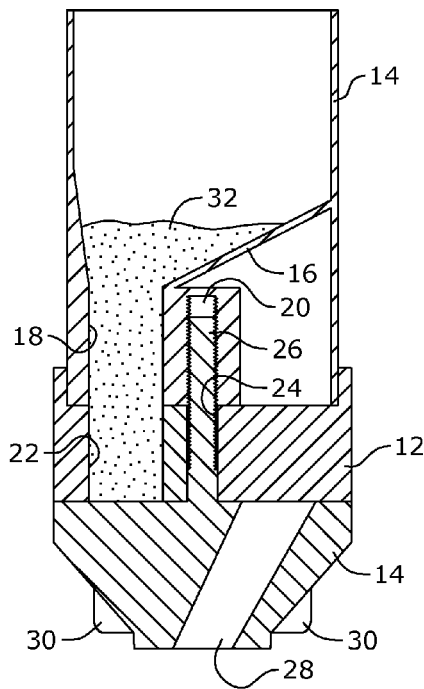
FIG. 4 is a section view of the present invention, showing a measuring chamber filled with granules.
Figure 5:
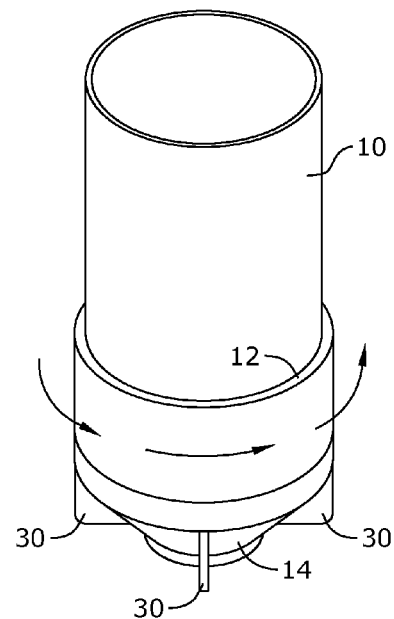
FIG. 5 is a perspective view of the present invention, illustrating the rotation of the measuring device.
Figure 6:
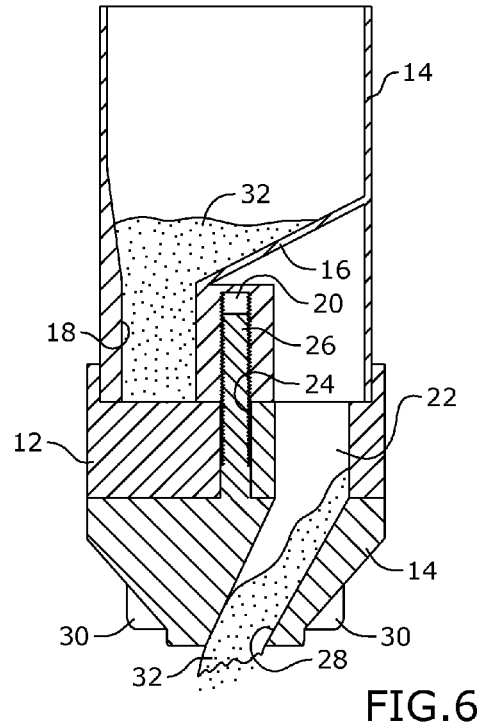
FIG. 6 is a section view of the present invention, showing the dispensing of the granules through an angled slot.

Referring now to FIGS. 1 through 6, the present invention includes a storage container 10, a measuring device 12 and a dispenser 14. The storage container 10 has a top end and a bottom end. The top end forms a top opening leading into the storage container 10. The bottom end forms a bottom opening leading out of the storage container 10. The storage container 10 includes an internal funnel 16 leading the top opening to an inner cylinder 18 which leads to the bottom opening. A threaded slot 20 may be positioned along a central vertical axis of the storage container 10.

The measuring device 12 includes a top end and a bottom end, and at least one measuring chamber 22, such as a plurality of measuring chambers 22. Each of the measuring chambers 22 includes a top opening leading into the measuring chamber 22 and a bottom opening leading out of the measuring chamber 22. A number of the measuring chambers 22 are arranged radially about a central axis of the measuring device 12. The number can be varied per application to alter the number of dispensed measured quantity of granules 32 per revolution of the measuring device 12. A non-threaded slot 24 is located along a central axis to the measuring device 12 and creates a cylindrical opening through the measuring device 12.

The dispenser 14 is formed to cover and uncover the bottom openings of each of the chambers 22. In certain embodiments, the dispenser 14 includes an angled slot 28 therethrough forming an opening at a top end and an opening at a bottom end. The top opening of the angled slot 28 is co-planar with the top surface of the dispenser 14. The bottom opening of the angled slot 28 is co-planar with the bottom surface of the dispenser 14. The bottom opening of the angled slot 28 may be located on the central vertical axis of the dispenser 14. The angled slot 28 forms an angled, vertically oriented cavity passing through the dispenser 14. A base cap may be added on which to set the present invention while not in use. The base cap may be cylindrical in shape with an inner diameter matching the outer diameter of the bottom of the dispenser 14.

In certain embodiments, a threaded post 26 is fixed to and located at the top of the dispenser 14. Alternatively, the threaded post 26 may be releasably attached to the dispenser 14 via a threaded receiver. The threaded post 26 is oriented vertically and along the central vertical axis of the dispenser 14. A number of the fins 30 may be arranged radially around the outside surface of the dispenser 14. To form the completed invention, the measuring device 12 is stacked on top of the dispenser 14. The threaded post 26 passes through the non-threaded slot 24. The storage container 10 is stacked on top of the measuring device 12. The threaded post 26 is connected to the threaded slot 20. In certain embodiments, the measuring device 12 may include a circular top ridge about a perimeter of the top end. The storage container 10 may be cylindrical in shape so that the bottom end of the storage device 10 fits and rotates within the top ridge.

In use, the top of the storage container 10 is open to permit filling with granules 32. The granules 32 are stored here until they are dispensed. A lid element may be used on top of the storage container 10 to secure the contained granules 32 and prevent spillage as the present invention is moved from one location to the next. When dispensed, the granules 32 flow through the funnel 16 and are guided by the inner channel 18 through the opening at the bottom of the inner channel 18 and, thus, exit the storage container 10. The threaded slot 20 serves as a connection for the threaded post 26. The threaded post 26 penetrates through the non-threaded slot 24 and is connected to the threaded slot 20 when the present invention is assembled. The threaded post 26 serves as a bearing about which the measuring device 12 rotates. The measuring device 12 is used for measuring the quantity of granules 32 to be dispensed. The measuring chamber 22 is a cavity sized according to the quantity to be measured for the application. The non-threaded slot 24 serves as an opening through which the threaded post 26 passes and a guide about which the component is rotated. The dispenser 14 is used to dispense the granules 32 into a desired container for use once measured. Granules 32 contained in the measuring chamber 22 are dispensed through the angled slot 28 as the measuring chamber 22 rotates over the top opening of the angled slot 28. Granules 32 exit the present invention through the opening at the bottom of the angled slot 28.

The present invention is operated by positioning the opening at the bottom of the angled slot 28 over the desired target for receiving the dispensed granules 32. The measuring device 12 is rotated and the desired measuring chamber 22 is positioned below the inner channel 18. The storage container 10 and the measuring device 12 include a plurality of rotated positions, where each position includes the bottom opening of the storage container 10 aligned with one of the top openings of the plurality of measuring chambers 22. Granules 32 are poured into the top opening of the storage container 10 and flow into the measuring chamber 22 until the measuring chamber 22 is full. As the measuring device 12 continues to rotate, other measuring chambers 22 may be filled. The measuring chambers 22 continue to rotate and each becomes positioned above the angled slot 28. The granules 32 contained in the chamber 22 flow into the angled slot 28 and exit through the bottom opening of the dispenser 14, to the target for receiving the dispensed granules 32.

The size or volume of the measuring chamber 22 can vary per application. In addition, the number of cavities for the measuring chamber 22 can vary per application. This enables the present invention to support multiple configurations. Multiple variants of the measuring device 12 based on multiple variants of the measuring chamber 22 can be included with the present invention, permitting varied configurations. Each configuration may provide a unique measured quantity and unique number of deliveries per rotation of the measuring device 12. This feature enables the present invention to deliver a range of precision for the measured quantity by replacing one measuring device 12 with another employing a unique configuration of the measuring chamber 22. The present invention is such that the storage container 10, the measuring device 12 and the dispenser 14 may be disassembled, and reassembled with a different measuring device 12 which employs a distinct configuration of the measuring chamber 22.

In alternate embodiments, the present invention can be reconfigured to permit the simultaneous storage of multiple kinds of granules 32. This reconfiguration may include separating the funnel 16 into multiple compartments to store each kind of granules 32 separately. Each compartment may include an inner channel 18 from which the granules would exit to the measuring chamber 22 below. Optionally, each compartment of the funnel 16 could be configured to be removable from the present invention allowing an interchange of compartments containing different kinds of granules 32. An additional angled slot 28 may be included in the dispenser 14. Each the angled slot 28 may be positioned to radially offset from the inner channel 18. As the measuring device 12 is rotated and each measuring chamber 22 aligns with an inner channel 18, granules 32 may exit the funnel 16, flowing through an inner channel 18, and filling a measuring chamber 22. As the rotation continues and each the measuring chamber 22 aligns with an angled slot 28, granules 32 may exit a measuring chamber 22, flowing through the angled slot 28 to be dispensed.

The present invention can be used in many applications for dispensing granules and other solids including, but not limited to, powders, gels, and pastes. The present invention can be configured for stationary use when the quantity is not appropriate for holding manually. The present invention is prepared for use by first adding granules into the funnel 16. The present invention can be located in relative close proximity to where dispensing occurs until needed. When granules need to be dispensed, the present invention (bottom of the angled slot 28) is positioned above the target and the measuring device 12 is rotated until the proper quantity has been dispensed. Once finished, the present invention can be returned to its desired location. Alternatively, the present invention can be mounted or set into a base in such a way that permits the target to be brought below the angled slot 28 to receive the dispensed granules 32.

Figure 9:
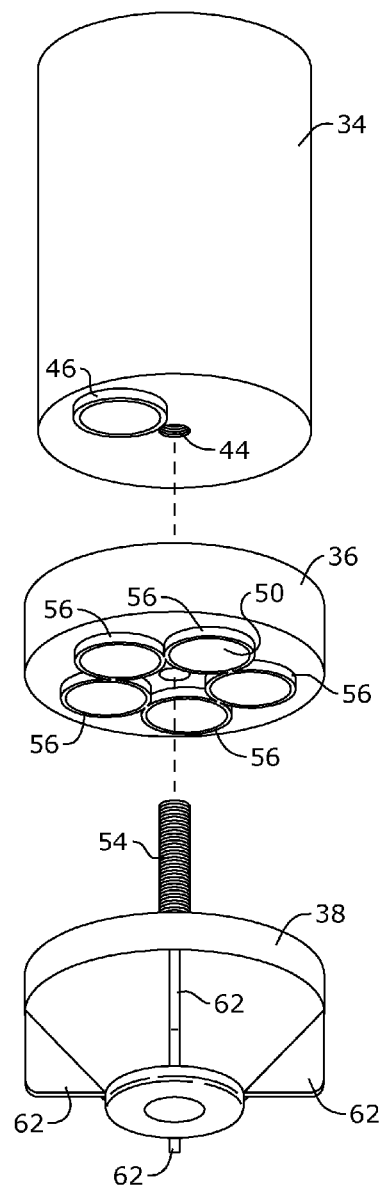
FIG. 9 is a bottom exploded view of an alternate embodiment of the present invention.
Figure 10:
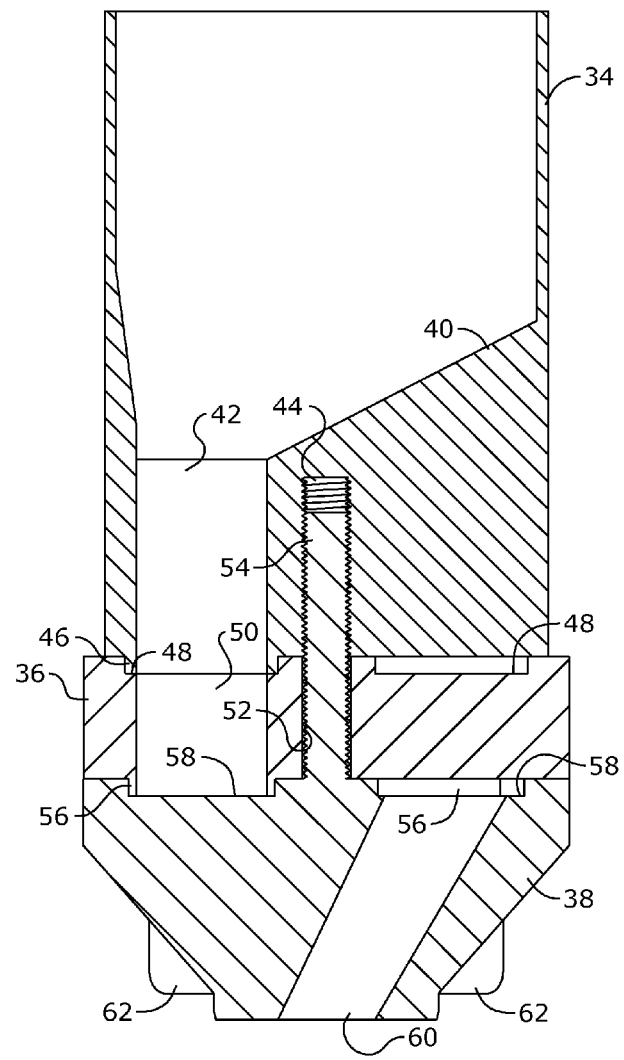
FIG. 10 is a section view of the present invention, taken along line 10-10 in FIG. 7.

Referring to FIGS. 7 through 10, an alternate embodiment of the present invention may include a storage container 34 with a funnel 40 and inner cylinder 42. The storage container 34 further includes a threaded slot 44 to receive the threaded post 54. The alternate embodiment further includes the measurer 36 having a plurality of measuring chambers 50 and a non-threaded slot 52 to receive the threaded post 54. The alternate embodiment further includes the dispenser 38 having the angled slot 60, the fins 62, and the threaded post 54 protruding from the top surface.

The alternate embodiment further includes mating portions to further engage the interfaces between the storage container 34, measuring device 36 and dispenser 38 for achieving tighter containment for very small granules. For example, the inner cylinder 42 includes a cylinder lip 46 protruding from a bottom portion of the storage container 34. The measuring device 36 may include a rim about the perimeter and the non-threaded slot 52, forming a recess 48 within which the cylinder lip 46 may sweep as the measuring device 36 is rotated. Further, each of the chambers 50 may include chamber lips 56 protruding from the bottom openings. The dispenser 38 may include an outer rim about the perimeter and another about the base of the threaded post 54, forming a dispenser recess 58 within which the chamber lips 56 may sweep as the measuring device 36 is rotated. The chamber lips 56 may be rotated above the top opening of the sloped slot 60 for delivery of the granules 32. The combinations of recesses and lips have the effect of sweeping any leaked granules out, and dispensing them, as the device is operated.

In certain embodiments, the present invention may be manufactured from a variety of suitable, food-grade materials. The inherent simplicity of the components of the present invention permits manufacture from a wide range of materials such as plastics, ceramics and metals. Each component may be manufactured as a separate item and assembled for use as described above.

It should be understood, of course, that the foregoing relates to exemplary embodiments of the invention and that modifications may be made without departing from the spirit and scope of the invention as set forth in the following claims.

What is claimed is:

1. A granule measurement apparatus comprising:
   a storage container having a top end and a bottom end, wherein the top end forms a top opening leading into the storage container, wherein the bottom end forms a bottom opening leading out of the storage container;
   a measuring device comprising a top end and a bottom end, and comprising an at least one measuring chamber comprising a top opening leading into the measuring chamber and a bottom opening leading out of the measuring chamber; and
   a dispenser comprising a top end and a bottom end, wherein a slot is formed therethrough forming an opening at the top end and the bottom end of the dispenser,
   a threaded post fixed to and protruding from the top end of the dispenser, wherein the measuring device comprises a non-threaded slot aligning with a threaded slot formed through the storage container, wherein the threaded post runs through the non-threaded slot and secures within the threaded slot, wherein the measuring device rotates about the threaded post.

2. The granule measurement apparatus of claim 1, wherein the slot of the dispenser is angled.

3. The granule measurement apparatus of claim 1, wherein the dispenser further comprises a plurality of fins extending from an outer surface.

4. The granule measurement apparatus of claim 1, wherein the storage container comprises an internal funnel leading the top opening to the bottom opening.

5. The granule measurement apparatus of claim 1, wherein the at least one measuring chamber is a plurality of measuring chambers.

6. The granule measurement apparatus of claim 5, wherein the storage container and the measuring device comprises a plurality of rotated positions, wherein each position comprises the bottom opening of the storage container aligned with one of the top openings of the plurality of measuring chambers.

7. The granule measurement apparatus of claim 1, wherein the measuring device comprises a top ridge about a perimeter, and wherein the bottom end of the storage device fits within the top ridge.

8. The granule measurement apparatus of claim 7, wherein the measuring device comprises a cylinder shape and the top ridge comprises a circular shape.

9. A granule measurement apparatus comprising:
   a storage container having a top end and a bottom end, wherein the top end forms a top opening leading into the storage container, wherein the bottom end forms a bottom opening leading out of the storage container;
   a measuring device comprising a top end and a bottom end, and comprising at least one measuring chamber comprising a top opening leading into the measuring chamber and a bottom opening leading out of the measuring chamber; and
   a dispenser formed to cover and uncover the bottom opening of the at least one measuring chambers and comprising an angled slot therethrough forming an opening at a top end and an opening at a bottom end of the dispenser,
   wherein the bottom end of the storage container and the top end of the measuring device mate and are rotatable relative to one another about a common axis.

* * * * *